United States Patent
Konuma (10) Patent No.: US 8,937,631 B2
(45) Date of Patent: Jan. 20, 2015

(54) IMAGE PROCESSING CIRCUIT AND IMAGE DISPLAY APPARATUS

(75) Inventor: Yasushi Konuma, Kanagawa (JP)

(73) Assignee: Sony Corporation (JP)

( * ) Notice: Subject to any disclaimer, the term of this patent is extended or adjusted under 35 U.S.C. 154(b) by 728 days.

(21) Appl. No.: 12/462,018

(22) Filed: Jul. 28, 2009

(65) Prior Publication Data

US 2010/0026731 A1 Feb. 4, 2010

(30) Foreign Application Priority Data

Jul. 31, 2008 (JP) ................ P2008-198307

(51) Int. Cl.
*G09G 5/10* (2006.01)
*H04N 5/202* (2006.01)
*G09G 5/04* (2006.01)
*H04N 9/69* (2006.01)

(52) U.S. Cl.
CPC .. *G09G 5/04* (2013.01); *H04N 9/69* (2013.01); *G09G 2320/0242* (2013.01); *G09G 2320/0276* (2013.01)
USPC ........................................... 345/690

(58) Field of Classification Search
CPC ........... G09G 5/10; G06K 9/00; H04N 5/202; H04N 9/69; H04N 5/14; H04N 5/235
USPC .......................................................... 345/690
See application file for complete search history.

(56) References Cited

U.S. PATENT DOCUMENTS

| | | | |
|---|---|---|---|
| 2006/0227239 A1* | 10/2006 | Nihei et al. | 348/362 |
| 2009/0066819 A1* | 3/2009 | Ando | 348/254 |
| 2009/0207191 A1* | 8/2009 | Zarubinsky et al. | 345/690 |

FOREIGN PATENT DOCUMENTS

| | | |
|---|---|---|
| JP | 11-113019 A | 4/1999 |
| JP | 2003087604 A | 3/2003 |

OTHER PUBLICATIONS

Office Action from Japanese Application No. 2008-198307, dated Apr. 27, 2010.

* cited by examiner

*Primary Examiner* — Tony N Ngo
(74) *Attorney, Agent, or Firm* — Lerner, David, Littenberg, Krumholz & Mentlik, LLP (57) ABSTRACT

An image processing circuit includes: a detecting unit detecting pixel regions where luminance levels of image signals exceed a given luminance threshold; and a correcting unit applying basic gamma correction to image signals in regions other than the pixel regions detected, and applying luminance increasing gamma correction to image signals in the pixel regions detected. The luminance increasing gamma correction allows the luminance levels to be increased.

6 Claims, 8 Drawing Sheets

IMAGE PROCESSING CIRCUIT AND IMAGE DISPLAY APPARATUS

CROSS-REFERENCE TO RELATED APPLICATION

The present application claims priority from Japanese Patent Application No. JP 2008-198307 filed in the Japanese Patent Office on Jul. 31, 2008, the entire content of which is incorporated herein by reference.

BACKGROUND OF THE INVENTION

1. Field of the Invention

The present invention relates to an image display apparatus which typically includes a liquid crystal display element, an organic electro luminescence element, etc., and to an image processing circuit applied to such image display apparatus. In particular, the invention relates to an image processing circuit and an image display apparatus to which an image quality improvement technology is applied.

2. Description of the Related Art

An image display apparatus such as a liquid crystal display element, an organic electro luminescence element, etc. adopts arts of whiteout prevention and white level expansion, etc. for improving image quality. Whiteout prevention is an art of preventing the detail of an image from being lost in highlight area, which is attained by detecting the maximum luminance of luminance signals and if the luminance level is saturated, reducing the luminance intensity with gamma correction. The white level expansion is an art of improving the contrast expression in high luminance portion by obtaining a luminance distribution within the display image from image signals, and when the area of a bright pixel portion, having the luminance level close to but under 100 percent of the maximum level, exceeds a given area threshold, carrying out gamma correction so as to further increase the area's luminance level up to 100 percent. Such approach has been applied to the whole portion of a display image uniformly in the past.

Japanese Patent Application Publication No. H11-113019 discloses an image display apparatus in which a white balance adjustment and gamma correction that is peculiar to a localized portion within a display image and different from the other portion thereof is applied to the localized portion. According to the disclosure, occurrence of luminance irregularity, chromaticity unevenness, etc. within the display image due to production tolerance of liquid crystal display elements and luminous energy distribution of back lights and so on, is prevented.

SUMMARY OF THE INVENTION

However, the above-mentioned white level expansion art does not always realize a satisfactory image quality of display. For example, when an image includes a localized shiny object portion such as neon lights of night view, the moon of night sky or reflection of lighting that are shining brightly, it is difficult to fully express the brightness thereof, thus contrast expression falls short of reality.

Figure 8:
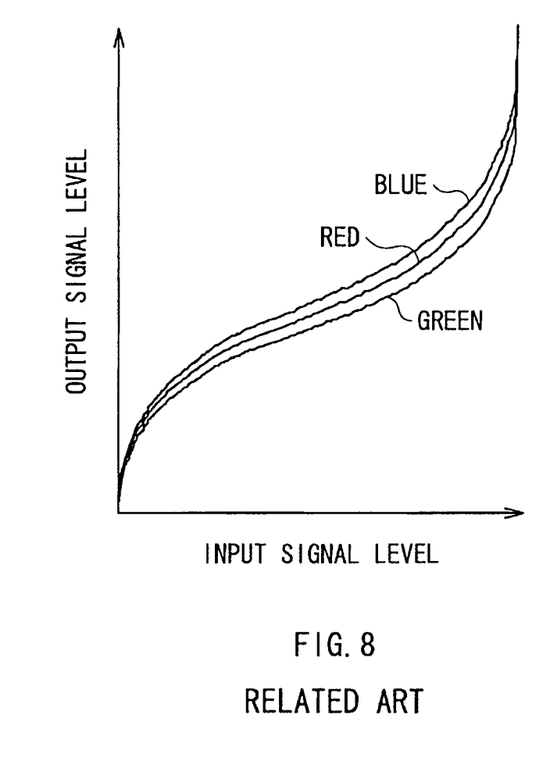
FIG. 8 illustrates a gamma correction table according to related art.

Such a problem is mainly due to such reasons as described below. For example, when no particular luminance correction is given to display elements such as a liquid crystal display element, there is a tendency that among red, green and blue, blue has the lowest luminance level and green has the highest luminance level due to the difference in luminous efficiency and transmission property of the elements. Thus luminance is corrected usually with different gamma characteristic for each colored light as illustrated in FIG. 8 for example, so as to optimize the white balance. Specifically, gamma characteristic for green is set so as to have an output signal level lower than the other colored lights all over the luminance range, and gamma characteristic for blue is set so as to have an output signal level higher than the other colored lights all over the luminance range. Namely, the red and green output signal levels are decreased to lower level than that of the blue output signal level to conform the luminance of red and green to the most inefficient luminance of blue. Thus, even though red and green may be displayed with higher luminance, their luminance level is suppressed with a waste of surplus capability. As a result, it is difficult to have a good contrast expression using the mixture of those three colors.

Meanwhile, in the above-mentioned JP-H11-113019A, the adjustment different from that of the other portion is applied to the localized portion of the display image. However, this technique merely applies the luminance correction independently to a predetermined portion of the display image to suppress the luminance irregularity, chromaticity unevenness, etc. within the display image, which are caused by the production tolerance of the display elements and the luminous energy distribution of back lights, etc., and the luminance correction is not performed dynamically in accordance with contents of the image. Thus, when the image includes a localized shiny object portion that is shining brightly, it is also difficult to express the brightness thereof with reality.

It is desirable to provide an image processing circuit and an image display apparatus capable of improving contrast expression of a portion of an image that should be displayed particularly with high luminance level.

An image processing circuit according to an embodiment of the present invention includes: detecting means for detecting pixel regions where luminance levels of image signals exceed a given luminance threshold; and correcting means for applying basic gamma correction to image signals in regions other than the pixel regions detected, and applying luminance increasing gamma correction to image signals in the pixel regions detected, the luminance increasing gamma correction allowing the luminance levels to be increased.

An image processing circuit according to an embodiment of the present invention includes: a detecting unit detecting pixel regions where luminance levels of image signals exceed a given luminance threshold; and a correcting unit applying basic gamma correction to image signals in regions other than the pixel regions detected, and applying luminance increasing gamma correction to image signals in the pixel regions detected, the luminance increasing gamma correction allowing the luminance levels to be increased.

An image display apparatus according to an embodiment of the present invention includes: detecting means for detecting pixel regions where luminance levels of image signals exceed a given luminance threshold; correcting means for applying basic gamma correction to image signals in regions other than the pixel regions detected, and applying luminance increasing gamma correction to image signals in the pixel regions detected, the luminance increasing gamma correction allowing the luminance levels to be increased; and displaying means for displaying an image on the basis of the image signals corrected by the correcting means.

An image display apparatus according to an embodiment of the present invention includes: a detecting unit detecting pixel regions where luminance levels of image signals exceed a given luminance threshold; a correcting unit applying basic gamma correction to image signals in regions other than the pixel regions detected, and applying luminance increasing gamma correction to image signals in the pixel regions detected, the luminance increasing gamma correction allowing the luminance levels to be increased; and a displaying unit displaying an image on the basis of the image signals corrected by the correcting unit.

In the image processing circuit and the image display apparatus according to the embodiments of the present invention, the luminance increasing gamma correction (contrast enhancing process) is applied to the image signals in the pixel regions where the luminance levels of the image signals exceed the given luminance threshold (highlight portion), and the usual gamma correction is applied to the image signals in the regions other than the pixel regions detected. As a result, the highlight portion within an image is emphasized more and contrast expression improves.

In the image processing circuit and the image display apparatus according to embodiments of the present invention, whether or not a difference in the luminance levels between the image signals in the pixel regions detected and the image signals in the regions other than the pixel regions detected is larger than a given luminance difference threshold may be detected, and the luminance increasing gamma correction may be applied to the image signals in the pixel regions detected (highlight portion), only when the difference in the luminance levels is larger than the luminance difference threshold. In this case, the contrast enhancing process is performed only to a sharply-defined highlight portion.

Alternatively, an area of the pixel regions may be detected, and the luminance increasing gamma correction may be applied to the image signals in the pixel regions detected (highlight portion) only when the area detected is smaller than an area threshold. In this case, the contrast enhancing process is performed only to a comparatively small highlight portion where a color drift is not so conspicuous due to human visual characteristics.

According to the image processing circuit and the image display apparatus of the embodiments of the present invention, the luminance increasing gamma correction (contrast enhancing process) is applied to the image signals in the pixel regions where the luminance levels of the image signals exceed the given luminance threshold, and the usual gamma correction is applied to the image signals in the regions other than the pixel regions detected. Thus, the highlight portion within the image is emphasized more and the contrast expression improves. Therefore, when a localized shiny portion is included in the image for example, the brightness of the shiny portion is fully expressed.

In addition, when the luminance increasing gamma correction is applied to the image signals in the pixel regions detected only when the difference in the luminance levels is larger than the luminance difference threshold (luminance level of the image signals changes greater than the given luminance difference threshold), the contrast enhancing process is applied only to the sharply-defined highlight portion (where the luminance changes rapidly). Therefore, the brightness of the shining objects is fully expressed. Further, when the luminance increasing gamma correction is applied only to the pixel regions of which area is smaller than the given area threshold, the contrast enhancing process is applied only to the comparatively small highlight portion. Therefore, even if luminance enhancement processing which may lack the color balance is performed, it is possible to make the color drift not so conspicuous in terms of human visual characteristics.

BRIEF DESCRIPTION OF THE DRAWINGS

FIGS. 3A and 3B illustrate one example of a display image to be used for explaining operation of a signal determination section, in which

DESCRIPTION OF THE PREFERRED EMBODIMENTS

Embodiments of the invention will be described in detail hereinbelow with reference to the drawings.
<First Embodiment>

Figure 1:
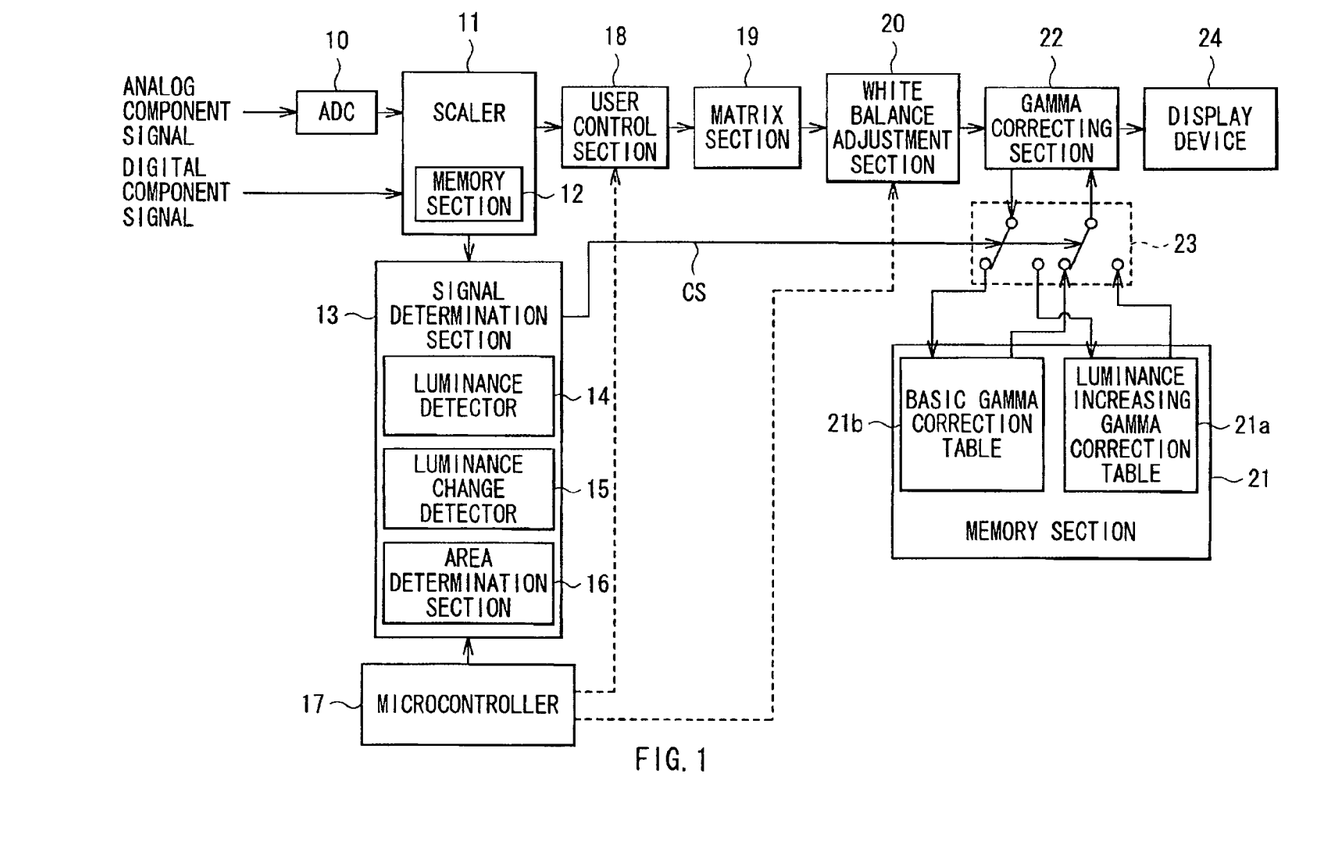
FIG. 1 is a block diagram illustrating a configuration of an image display apparatus according to a first embodiment of the present invention.
Figure 2A:
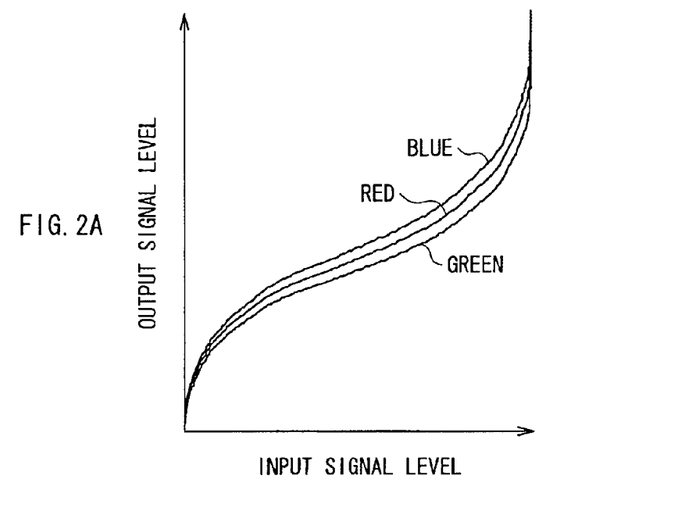
FIGS. 2A and 2B illustrate gamma correction tables used in the image display apparatus of FIG. 1.
Figure 2B:
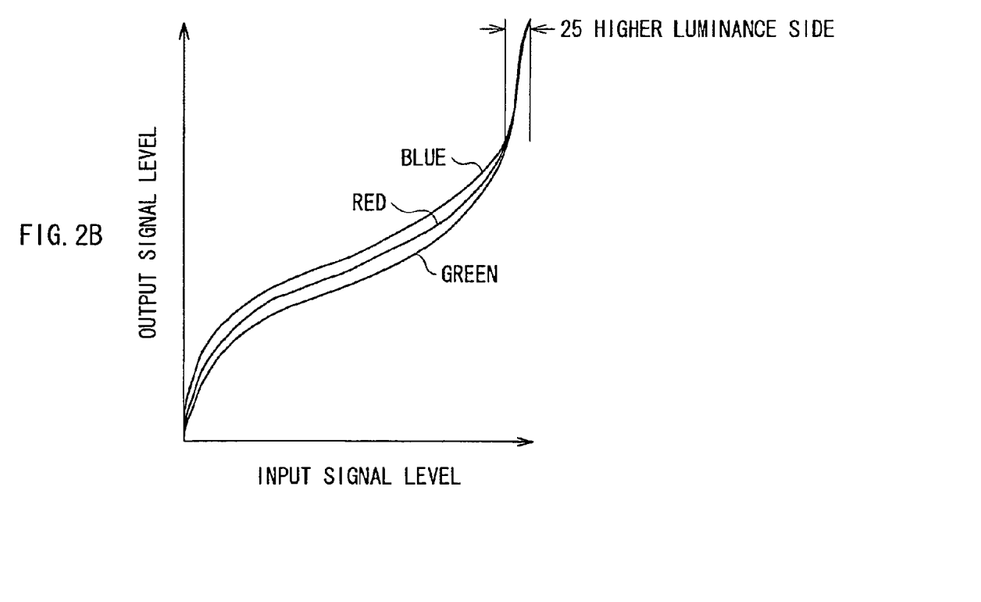

FIG. 1 is a configuration block of an image display apparatus including an image processing circuit according to a first embodiment of the present invention. FIGS. 2A and 2B represent gamma correction tables to be hereinafter described.

The image display apparatus 1 includes an analog-to-digital converter (ADC) 10, a scaler 11, a signal determination section 13, a microcontroller 17, a user control section 18, a matrix section 19, a white balance adjustment section 20, a memory section 21, a gamma correcting section 22, and a display device 24. Here, the signal determination section 13 and the gamma correcting section 22 mainly corresponds to a specific example of the image processing circuit according to the embodiment of the invention.

ADC10 converts an analog component signal into a digital component signal. The scaler 11 selects either one of a component signal directly inputted from outside and a component signal outputted from the ADC10, and performs scaling of image size to be suitable to the display resolution of the display device 24. The scaler 11 has a memory section 12. This memory section 12 is configured as a line buffer that stores at least a few horizontal lines of an image signal transmitted with the inputted component signal.

The signal determination section 13 includes a luminance detector 14, a luminance change detector 15, and an area determination section 16. The luminance detector 14 extracts the luminance level from the image signal stored in the memory section 12, compares a given luminance threshold with the extracted luminance level, and detects a high luminance pixel region exceeding the luminance threshold. Here, the high luminance pixel region corresponds to a specific example of "pixel regions where luminance levels of image signals exceed a given luminance threshold" or "pixel region that satisfies a first requirement" according to the embodiment of the present invention.

The luminance change detector 15 extracts a luminance change signal representing a luminance change by having the image signal pass through a high pass filter, compares a given luminance difference threshold with the luminance change signal, and detects a largely changed luminance pixel region, which is bounded by pixels whose luminance change exceeds the luminance difference threshold. Here, the largely changed luminance pixel region corresponds to a specific example of "pixel regions where the luminance levels of the image signals change larger than a given luminance difference threshold" or "pixel region that satisfies a second requirement" according to the embodiment of the present invention. The luminance detector 14 and the luminance change detector 15 correspond to specific examples of "detecting means" and "detecting unit" according to the embodiment of the present invention.

The area determination section 16 detects an area of the overlapped range in which the high luminance pixel region and the largely changed luminance pixel region detected by the signal determination section 13 are overlapped, and compares the overlapped range with a specified area threshold. When this overlapped range is smaller than the area threshold, the area determination section 16 detects the overlapped range as a luminance increasing correction target region. The luminance increasing correction target region thus detected is a pixel region that occupies a small space within the image, has high luminance, and in which a difference in brightness from its surrounding is large. Here, the area determination section 16 corresponds to a specific example of "determination means" and "determination unit" according to the embodiment of the present invention.

The signal determination section 13 outputs a control signal CS instructing that a gamma correction, different from that for the other pixel regions, should be given to the luminance increasing correction target region obtained through the area determination section 16.

The microcontroller 17 sets up the threshold value in advance for the luminance detector 14, the luminance change detector 15 and the area determination section 16 respectively. Each threshold value may be determined optionally. The microcontroller 17 also controls the user control section 18 and the white balance adjustment section 20.

The user control section 18 makes adjustment of contrast and brightness in the image signal outputted from the scaler 11. The adjustment is performed by the microcontroller 17 controlling the user control section 18 with an instruction from a user. The matrix section 19 converts the image signal (luminance signals/color-difference signals) outputted from the user control section 18 into an RGB signal. The white balance adjustment section 20 performs the color adjustment of the RGB signal outputted from the user control section 18. Specifically, color temperature on the white side (higher luminance side) is modulated with gain adjustment, and color temperature on the black side (lower luminance side) is modulated with bias adjustment.

The memory section 21 stores therein a luminance increasing gamma correction table 21a with which luminance increasing gamma correction for further increasing intensity of luminance is given to the luminance increasing correction target region within the image, and a basic gamma correction table 21b with which usual basic gamma correction is given to the pixel regions other than the luminance increasing correction target region. Details of the gamma correction tables will be mentioned later.

The gamma correcting section 22 is connected to the memory section 21 via a switch section 23. The switch section 23 selects one of the switches to be connected according to the control signal CS outputted from the signal determination section 13. The gamma correcting section 22 carries out the basic gamma correction to the image signal other than that of the detected luminance increasing correction target region, from among the RGB signal outputted from the white balance adjustment section 20, by application of the basic gamma correction table 21b. On the other hand, the gamma correcting section 22 carries out the luminance increasing gamma correction for further increasing the intensity of the luminance to the image signal of the luminance increasing correction target region by application of the luminance increasing gamma correction table 21a, so as to perform the luminance correction of the inputted image. Here, the gamma correcting section 22 corresponds to a specific example of "correcting means" and "correcting unit" according to the embodiment of the present invention.

The display device 24 displays images based on the RGB signal outputted from the gamma correcting section 22. The display device 24 may be any of liquid crystal display panel, plasma display panel, field emission type display, organic electro luminescence display panel, and a cathode-ray tube. Here, the display device 24 corresponds to a specific example of "displaying means" and "displaying unit" according to the embodiment of the present invention.

Next, description is made on the gamma correction table stored in the memory section 21. The gamma correction table includes the basic gamma correction table 21b illustrated in FIG. 2A and the luminance increasing gamma correction table 21a illustrated in FIG. 2B. The basic gamma correction table 21b is a correction table of such gamma characteristics as to optimize the white balance, in which a relationship of output signal level and input signal level is represented for red, green and blue respectively. Namely, if the basic gamma correction table 21b is applied to pixels, the image displayed becomes white as far as the input signal level is equal among red, green and blue. The basic gamma correction table 21b illustrated in FIG. 2A is set so that a ratio of the output signal to the input signal may be high in the order of blue, red and green in view of transmission property, luminous efficiency, and so on of the display device.

The luminance increasing gamma correction table 21a is a correction table of such gamma characteristics as to intensify the high luminance region (what is called highlight portion) within the image, and has input-output characteristics different from that of the basic gamma correction table 21b on the white side range (higher luminance side 25) of the input signal. Specifically, the red and green output signal levels are raised higher than those of the basic gamma correction table 21b up to the level equal to the blue output signal level on the higher luminance gradation range 25. Thereby, when the red, green and blue signals on the higher luminance side 25 are inputted respectively, pixels to which the luminance increasing gamma correction table 21a is applied display an image of higher luminance than the case of application of the basic gamma correction table 21b. Here, although the luminance increasing gamma correction table 21a has such gamma characteristics as to raise the red and green output signal levels up to the blue output signal level on the higher luminance side 25, other gamma characteristics may be available as far as the total luminance intensity in the high luminance range 25 is further raised.

Figure 3A:
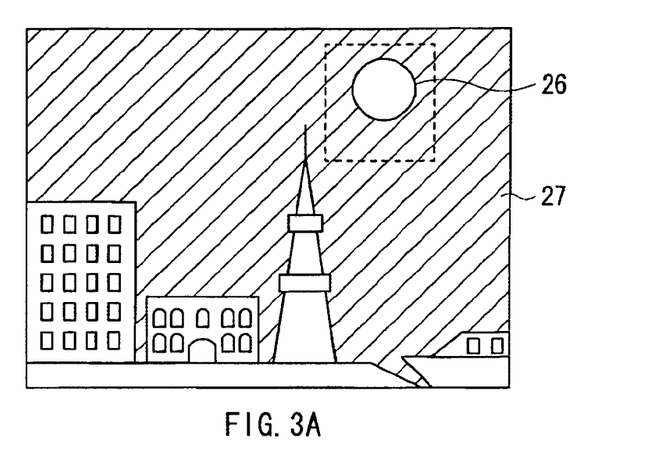
FIG. 3A illustrates an image of an entire screen.
Figure 3B:
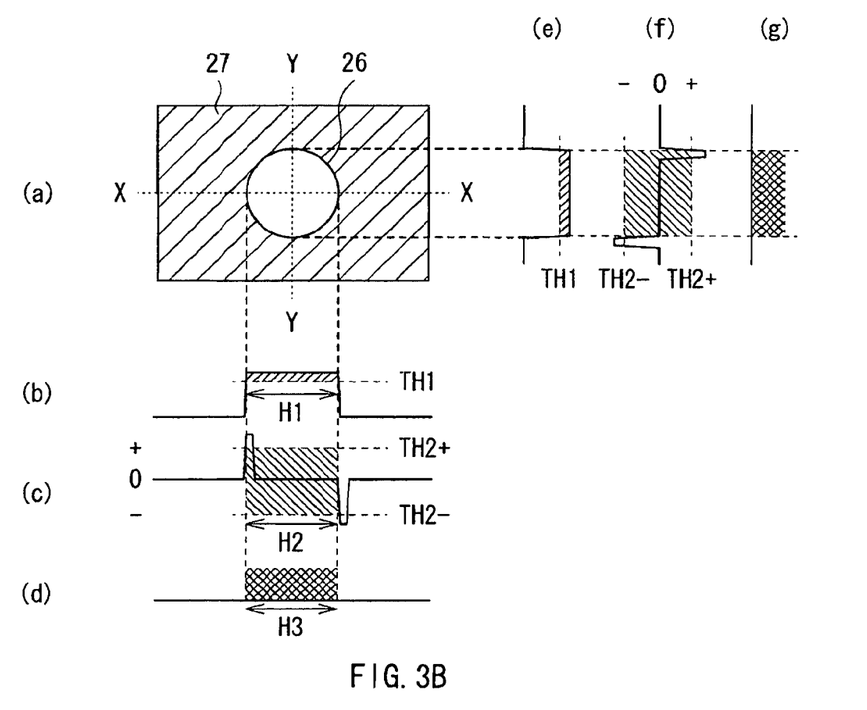
FIG. 3B is an enlarged view of a part of the image illustrated in FIG. 3A.

Next, operation of such configured image display apparatus 1 will be described hereinbelow with reference to FIGS. 3A and 3B. FIGS. 3A and 3B indicate an example of a specific image to be used for describing the operation of the signal determination section 13, in which FIG. 3A illustrates a whole image view, and FIG. 3B illustrates an enlarged view of a localized portion of FIG. 3A.

Suppose that the image data inputted into the scaler 11 is of a night view including a moon 26 displayed at high luminance, as illustrated in FIG. 3A, for example. At this time, the scaler 11 enlarges or reduces the image data to conform with the required display resolution of the display device 24, then stores the image data into the memory section 12.

The luminance detector 14 of the signal determination section 13 determines whether the luminance level of the image signal is larger than, or equal to or less than, a specified luminance threshold in both of the horizontal direction (the direction of X-X) and the vertical direction (the direction of Y-Y) of the image, respectively for image signals of two or more horizontal lines among the image data stored in the memory section 12. Then, the luminance detector 14 detects a region where the luminance level is larger than the luminance threshold as the high luminance pixel region. Here, it is to be noted that the luminance level determination is available not only for the horizontal pixel row but also for the vertical pixel row with reference to the two or more lines of the image signals.

Specifically, processing will be executed as follows. Since the image of FIG. 3A includes a highlight portion of the moon 26 as illustrated in Part (a) of FIG. 3B, the portion corresponding to the moon 26 exhibits high luminance level as illustrated in Part (b) and Part (e) of FIG. 3B. In this case, since the luminance level of the portion corresponding to the moon 26 is higher than the specified luminance threshold TH1, the region corresponding to the portion of the moon 26 is detected as a high luminance pixel region H1 as represented by shadows.

The luminance change detector 15 of the signal determination section 13 takes in the image signals for the two or more horizontal lines among the image data stored in the memory section 12, and causes them to pass through a high pass filter, thereby obtaining luminance change signals (signals obtained by differentiating luminance signals) for both of the horizontal and the vertical directions of the image. The luminance change detector 15 then determines whether the obtained luminance change signals is larger than, or equal to or less than, a specified luminance difference threshold, and detects the pixel region bounded by the pixels whose luminance change exceeds the luminance difference threshold as the largely changed luminance pixel region. Here, since the high pass filter is applied to the image signals of the two or more lines and only those passing through the filter are referred, not only horizontal luminance change but also vertical luminance change is detectable.

Specifically, processing will be executed as follows. Since luminance is changed from lower level to higher level (or vice versa) at the boundary between the moon 26 and night sky 27 as illustrated in FIG. 3B, such luminance change signals as illustrated in Part (c) and Part (f) of FIG. 3B are obtained. Portion of positive reference numeral in the luminance change signals represents a change of luminance from lower level to higher level, and portion of negative reference numeral in the luminance change signals represents a change thereof from higher level to lower level. If the absolute value of a luminance change signal is large (small), that means that the amount of luminance change is large (small). In the Part (c) and Part (f) of FIG. 3B, the luminance change signal exceeds the specified luminance difference threshold TH2+ and TH2− at the boundary between the moon 26 and the night sky 27. Accordingly, region bounded by pixels in which the level of the luminance change signal is larger in the positive direction and pixels in which the level of the luminance change signal is larger in the negative direction (corresponding to the portion of the moon 26) is detected as a largely changed luminance pixel region H2. The largely changed luminance pixel region H2 represents a region where the amount of luminance change is large relative to surrounding pixels and where the luminance changes from low to high to low in order.

The signal determination section 13 obtains a region H3 where the high luminance pixel region H1 detected by the luminance detecting section 14 and the largely changed luminance pixel region H2 detected by the luminance change detecting section 15 are overlapped, by means of AND operation for both of the horizontal and the vertical directions of the image. As a result, a pixel region H3 where the luminance level is higher than the surrounding pixels and the amount of luminance change compared with the surroundings is larger than a given threshold is obtained as represented by shadows in Part (d) and Part (g) of FIG. 3B.

Next, the area determination section 16 of the signal determination section 13 determines whether the area of the obtained overlapped region (pixel region H3) is equal to or larger than, or less than, a specified area threshold, and when it is smaller than the threshold, determines the region H3 to be the luminance increasing correction target region (hereinafter may be referred to as specified pixel field). The luminance increasing correction target region thus obtained is a region where the area thereof occupied in the image is smaller than a given criteria (area threshold), the luminance level is equal to or higher than a given criteria (luminance threshold), and the amount of luminance change compared with the surrounding pixels is larger than a given criteria (luminance difference threshold).

The signal determination section 13 outputs the control signal CS to the switch section 23 so that different gamma corrections are applied to the image signals of the specified pixel field in the image detected by the area determination section 16 and the image signals of regions other than the specified pixel field respectively.

The gamma correcting section 22 reads out the luminance increasing gamma correction table 21a from the memory section 21 and applies the same to the image signals of the specified pixel field among the RGB signal outputted from the white balance adjustment section 20, and the gamma correcting section 22 reads out the basic gamma correction table 21b from the memory section 21 and applies the same to image signals of regions other than the specified pixel field, in accordance with the selection of the switch section 23. Thereby, the luminance increasing gamma correction is applied to the specified pixel field so as to increase its luminance much more, while the usual basic gamma correction is applied to the other pixel regions so as to give priority to white balance adjustment. The display device 24 displays an image based on the RGB signal corrected by the gamma correcting section 22.

Therefore, according to the present embodiment, since the specified pixel field is extracted from an image, and gamma correction by which only the luminance of the specified pixel field is increased is performed, brightness of the specified pixel field is expressed at the highest level. Here, in the specified pixel field, since the gamma characteristics for red and green are modulated to be matched with the level of the gamma characteristics for blue, the luminance balance (white balance) of respective colors may be disrupted. However, it is difficult for human eyes to visually recognize the disruption of chromaticity balance in a small area, and the visibility to color drift is particularly low in a high luminance gradation range. For this reason, the disruption in luminance balance of colors will not be a concern for a user, but rather, improvement in its brightness due to the increase in luminance is felt by the user. As a result, the contrast of the display image becomes more impressive and image quality is improved.

<Second Embodiment>

Next, another embodiment of the present invention will be described hereinbelow. In describing the following embodiment, same reference numerals as in the above first embodiment have been applied to indicate identical component elements, and detailed descriptions thereof will be omitted or just simply described.

Figure 4:
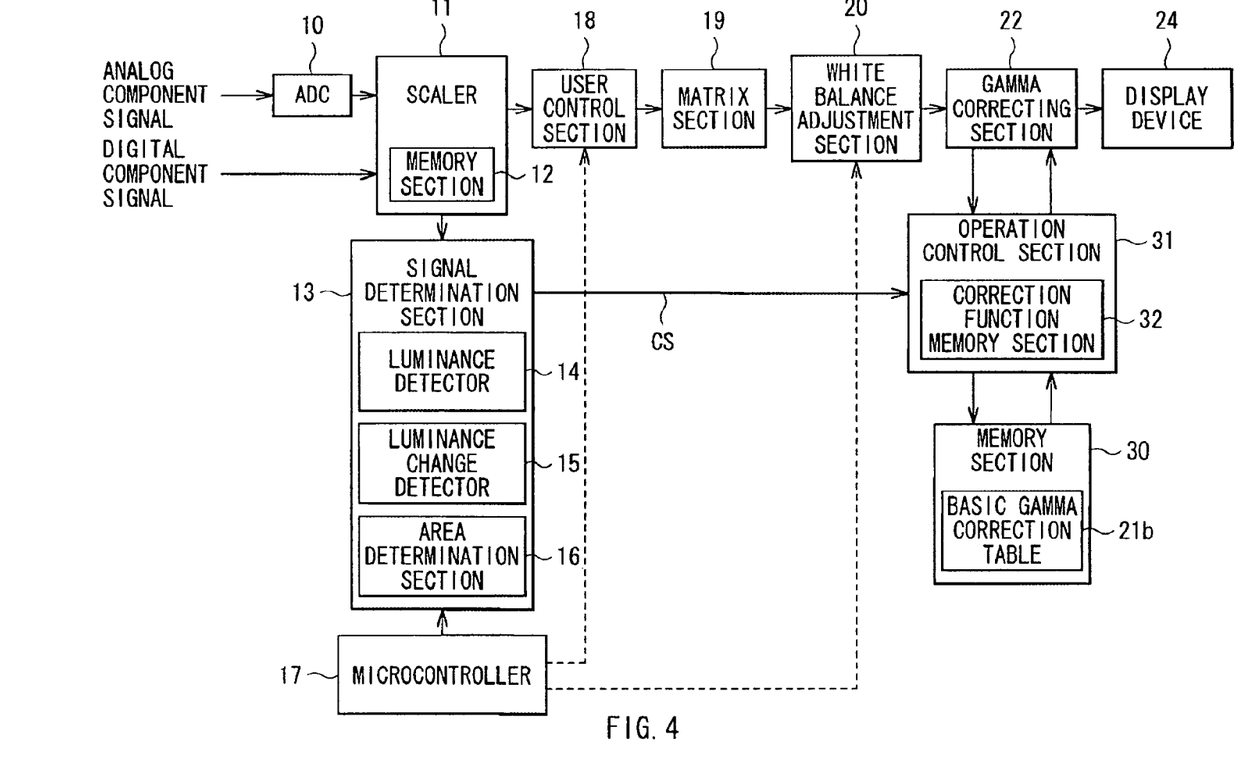
FIG. 4 is a block diagram illustrating a configuration of an image display apparatus according to a second embodiment of the present invention.
Figure 5A:
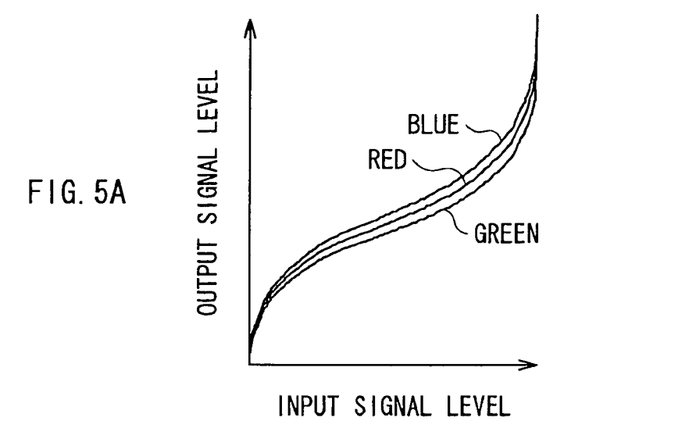
FIGS. 5A and 5C illustrate gamma correction tables and FIG. 5B illustrate a correction function, used in the image display apparatus of FIG. 4.
Figure 5B:
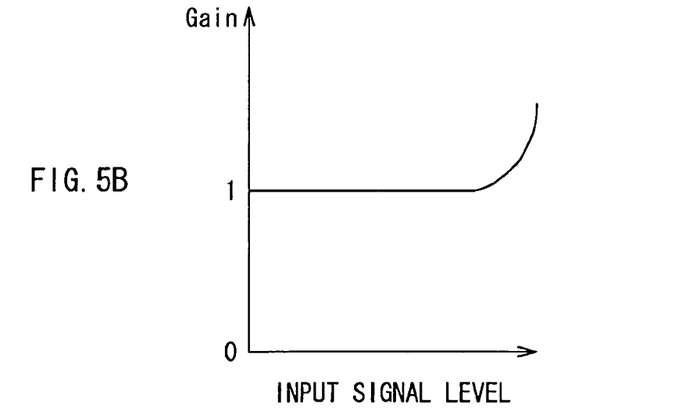
Figure 5C:
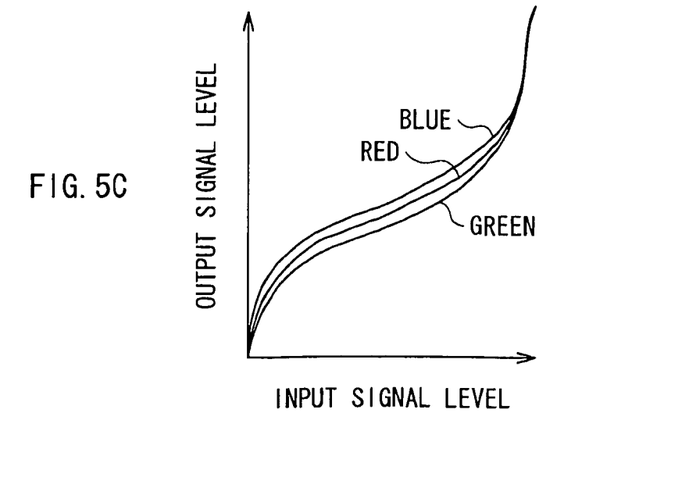

FIG. 4 illustrates a schematic configuration of an image display apparatus according to a second embodiment of the present invention. FIGS. 5A and 5C illustrate gamma correction tables, and FIG. 5B illustrates a correction function.

The image display apparatus 2 according to the present embodiment is different from the image display apparatus 1 of the first embodiment in that the switch section 23 and the memory section 21 are replaced by an operation control section 31 and a memory section 30.

The memory section 30 stores therein only the basic gamma correction table 21b. The operation control section 31 creates the luminance increasing gamma correction table (FIG. 5C) by reading out the basic gamma correction table 21b from the memory section 30 and modulating its gamma characteristics with correction function. The correction function is stored in a correction function memory section 32 provided in the operation control section 31, and is read out therefrom at the time of operation.

Next, operation of the image display apparatus 2 configured in such a manner will be described hereinafter.

The signal determination section 13 outputs the control signal CS to the correction function memory section 32 so that different gamma corrections are applied to the specified pixel field detected by the area determination section 16 and to the other pixel regions excluding the specified pixel field, respectively.

The operation control section 31 reads out the basic gamma correction table 21b (FIG. 5A) from the memory section 30 and the correction function (FIG. 5B) from the correction function memory section 32, according to the control signal CS. This correction function has such characteristics that a gain is 1 (one) on the lower luminance side and the gain increases in accordance with the increase in the level of input signals on the higher luminance side. The operation control section 31 further carries out an operation (multiplication for example) with the correction function for modulating the basic gamma correction table 21b, to create the luminance increasing gamma correction table (FIG. 5C) having such characteristics as to raise the level of red and green output signals up to the level of the blue output signal on the higher luminance side.

Subsequent operation is similar to that of the case of the above-mentioned first embodiment. Namely, the gamma correcting section 22 applies the luminance increasing gamma correction table created with the correction function to the image signals of the specified pixel field among the RGB signal outputted from the white balance adjustment section 20, and the gamma correcting section 22 applies the basic gamma correction table 21b read out from the memory section 30 as it is to the image signals of regions other than the specified pixel field. Thereby, the luminance increasing gamma correction is applied to the specified pixel field so as to increase intensity of the luminance much more, while the usual basic gamma correction is applied to the other pixel regions so as to give priority to white balance adjustment. The display device 24 displays an image based on the RGB signal corrected by the gamma correcting section 22.

Thus, according to the present embodiment, since the brightness of the specified pixel field is expressed as high level as possible etc., as with the first embodiment, image contrast is enhanced more and image quality is thus improved. In addition, according to the present embodiment, since the memory section 30 stores only the data of the basic gamma correction table 21b, memories for structuring the memory section 30 is reduced.

The present invention has been described with reference to the embodiments as mentioned above, but it is not limited to the above-mentioned embodiments and various modifications are possible.

For example, although only one luminance increasing gamma correction table is used in the above-described embodiments, a plurality of luminance increasing gamma correction tables may be prepared to select appropriate one from among those at the time of the gamma correction. Namely, a plurality of area threshold values may be prepared in the area determination section 16 to determine a size of the area of the specified pixel field in multiple stages, so that the luminance increasing gamma correction tables to be applied may be changed suitably according to the determination result. More specifically, for example, gamma correction operation may be performed as follows.

Figure 6A:
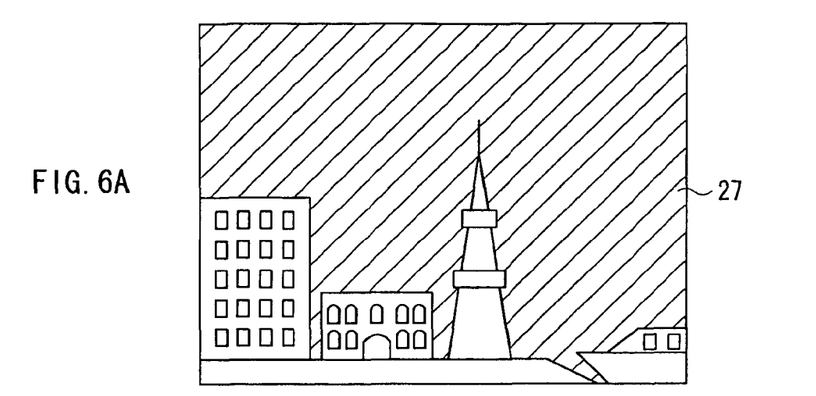
FIGS. 6A to 6C illustrate a few examples of display images.
Figure 6B:
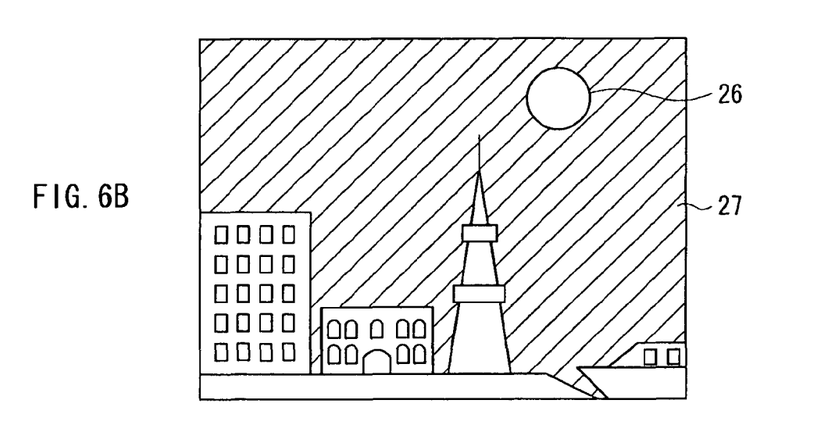
Figure 6C:
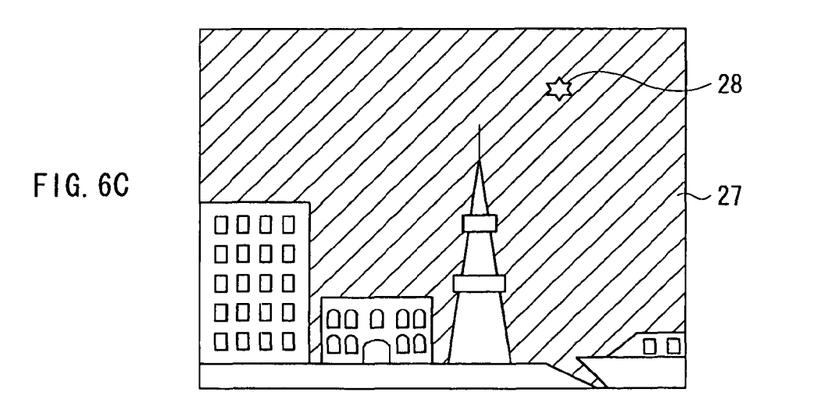
Figure 7A:
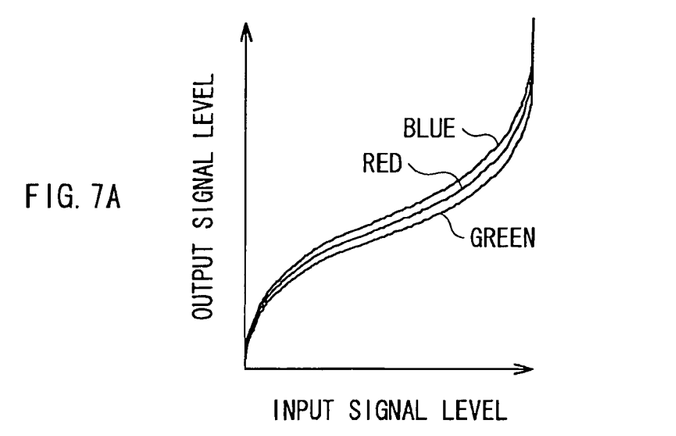
FIGS. 7A to 7C illustrate gamma correction tables to be applied suitably to the corresponding cases of FIGS. 6A to 6C, respectively, in accordance with an area of a specified pixel field.
Figure 7B:
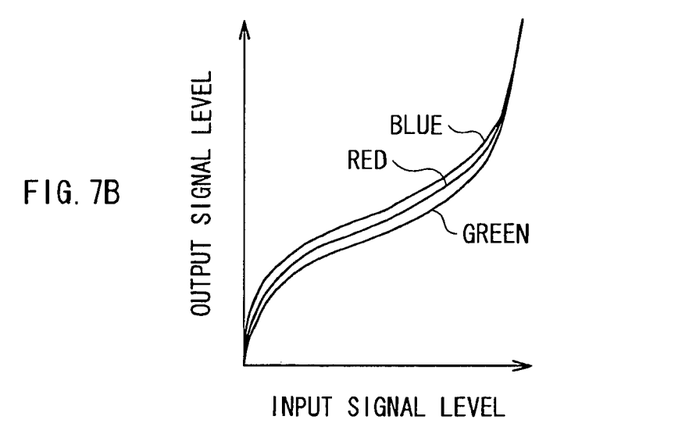
Figure 7C:
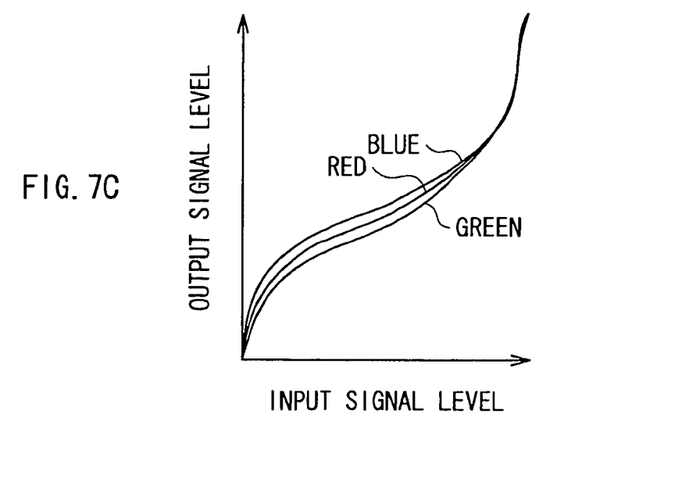

FIGS. 6A to 6C are views illustrating a few specific examples of display image views, and FIGS. 7A to 7C illustrate gamma correction tables to be applied suitably to the respective FIGS. 6A to 6C according to the area of the specified pixel fields included in FIGS. 6A to 6C. For example, since the night sky image 27 of FIG. 6A includes no specified pixel field, a basic gamma correction table of FIG. 7A is applied thereto. Since the area determination section 16 determines that the image of FIG. 6B includes a specified pixel field (moon 26) of which area is equal to or larger than a first area threshold and smaller than a second area threshold, a luminance increasing gamma correction table of FIG. 7B is applied to the specified pixel field. Since the area determination section 16 determines that the image of FIG. 6C includes a specified pixel field (moon 28) of which area is equal to or larger than the second area threshold, a luminance increasing gamma correction table (with reference to FIG. 7C), in which the higher luminance gradation range is further expanded compared with the luminance increasing gamma correction table of FIG. 7B, is applied to the specified pixel field. Thus, since the most optimal luminance increasing gamma correction is applied in accordance with the size of highlight portions by changing the appropriate luminance increasing gamma correction tables in accordance with the area of the specified pixel fields, more delicate control is possible.

In the above mentioned embodiments, description is made on the case where only one specified pixel field exists in one image. However, when there are two or more specified pixel fields included in one image, luminance increasing gamma correction may be given to all of them respectively. In this case, the luminance increasing gamma correction tables to be applied to the respective specified pixel fields may be different from each other.

In the above-mentioned embodiments, although description is made on a case where only one basic gamma correction table 21b is prepared, the basic gamma correction table 21b may be selected from among two or more basic gamma correction tables 21b in accordance with the kinds of display images. In this case, the luminance increasing gamma correction table may be selectable in accordance with the selection of the basic gamma correction table 21b.

In the above-mentioned embodiments, although description is made on a case where the luminance increasing gamma correction table is applied to the specified pixel field that satisfies both of the first and second requirements, it is not limited thereto. Namely, the luminance increasing gamma correction table may be applied to image signals of a high luminance pixel region whose luminance level is higher than given threshold (field that satisfies the first requirement only) to carry out the luminance increasing gamma correction thereto for further increasing its luminance level, while the basic gamma correction table 21b may be applied to image signals other than those of the high luminance pixel region to carry out the basic gamma correction thereto.

In the above-mentioned embodiment, although the overlapped range of the high luminance pixel region and the largely changed luminance pixel region is determined as the luminance increasing correction target region only to the case where the size of the overlapped range is smaller than a given size threshold, the overlapped range of the high luminance pixel region and the largely changed luminance pixel region may be directly determined to be the luminance increasing correction target region without limiting the size of the overlapped range.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for performing luminance correction to an input image signal, said apparatus comprising:
   a processing circuit to (i) detect a first pixel region or regions where luminance levels of image signals representative of an image or images exceed a given luminance threshold in both a horizontal direction and a vertical direction of the image or images and to detect a second pixel region or regions bounded by pixels whose luminance change exceeds a given luminance difference threshold in both the horizontal direction and the vertical direction of the image or images, (ii) obtain an overlap region or regions where the first pixel region(s) and the second pixel region(s) overlap, (iii) determine a size of an area of a respective overlap region, and (iv) apply a first luminance increasing gamma correction or a second luminance increasing gamma correction to image signals in the respective overlap region depending upon the determined size of the area of the respective overlap region, such that (i) when the determined size of the area of the respective overlap region satisfies a first predetermined condition the first luminance increasing gamma correction is applied to the image signals and (ii) when the determined size of the area of the respective overlap region satisfies a second predetermined condition which is different from the first predetermined condition the second luminance increasing gamma correction is applied to the image signals,
   in which the first luminance increasing gamma correction is different from the second luminance increasing gamma correction,
   in which both the first luminance increasing gamma correction and the second luminance increasing gamma correction allow the luminance levels to be increased, and
   in which the first predetermined condition includes being smaller than a first predetermined area and the second predetermined condition includes being smaller than a second predetermined area which is smaller than the first predetermined area, such that (i) when the determined size of the area of the respective overlap region is smaller than the first predetermined area the first luminance increasing gamma correction is applied to the image signals and (ii) when the determined size of the area of the respective overlap region is smaller than the second predetermined area which is smaller than the first predetermined area the second luminance increasing gamma correction is applied to the image signals.

2. The apparatus according to claim 1, further comprising a display device to display an image output from the processing circuit.

3. The apparatus according to claim 1, further comprising a first gamma correction table for the first luminance increasing gamma correction and a second gamma correction table for the second luminance increasing gamma correction.

4. The apparatus according to claim 1, in which when a plurality of overlap regions are obtained, a respective size of an area of each of the plurality of overlap regions is determined and the first luminance increasing gamma correction or the second luminance increasing gamma correction is applied to image signals in each of the respective overlap regions depending upon the determined size thereof.

5. The apparatus according to claim 1, in which when the determined size of the area of the respective overlap region fails to satisfy the first predetermined condition and the second predetermined condition a basic gamma correction is applied to the image signals, in which both the first luminance increasing gamma correction and the second luminance increasing gamma correction each has characteristics on a white side range different from that of the basic gamma correction.

6. The apparatus according to claim 5, in which the characteristics on the white side range of the first luminance increasing gamma correction and the second luminance increasing gamma correction which are different from that of the basic gamma correction include output signal levels of red and green signals which are raised up to a level equal to that of blue signals.

* * * * *